United States Patent
McKenzie et al.

(10) Patent No.: US 9,477,653 B2
(45) Date of Patent: Oct. 25, 2016

(54) CHARACTER ENTRY FOR AN ELECTRONIC DEVICE USING A POSITION SENSING KEYBOARD

(71) Applicant: BlackBerry Limited, Waterloo (CA)

(72) Inventors: Donald Somerset McCulloch McKenzie, Waterloo (CA); Jerome Pasquero, Montreal (CA); Jennifer Xin Bin, Nobleton (CA)

(73) Assignee: BlackBerry Limited, Waterloo, Ontario (CA)

( * ) Notice: Subject to any disclaimer, the term of this patent is extended or adjusted under 35 U.S.C. 154(b) by 183 days.

(21) Appl. No.: 14/315,912

(22) Filed: Jun. 26, 2014

(65) Prior Publication Data

US 2015/0378982 A1  Dec. 31, 2015

(51) Int. Cl.
*G06F 3/048* (2013.01)
*G06F 17/22* (2006.01)
*G06F 17/27* (2006.01)
*G06F 3/023* (2006.01)
*G06F 3/0488* (2013.01)
*G06F 3/0482* (2013.01)
*G06N 5/04* (2006.01)
*H04M 1/725* (2006.01)

(52) U.S. Cl.
CPC .......... *G06F 17/276* (2013.01); *G06F 3/0236* (2013.01); *G06F 3/0237* (2013.01); *G06F 3/0482* (2013.01); *G06F 3/04886* (2013.01); *G06N 5/048* (2013.01); *H04M 1/72552* (2013.01); *H04M 2250/70* (2013.01)

(58) Field of Classification Search
CPC ... G06F 3/04886; G06F 17/276; G06F 3/017
See application file for complete search history.

(56) References Cited

U.S. PATENT DOCUMENTS 6,204,839 B1  3/2001  Mato, Jr.
7,453,439 B1 *  11/2008  Kushler ................ G06F 3/0237
345/168

(Continued)

FOREIGN PATENT DOCUMENTS

EP          1975808          10/2008
WO    WO 2007/084078 A1 *  4/2006
WO       WO2012076742       6/2012

OTHER PUBLICATIONS

Laptopmag.com: Just Your Type: The Best Smartphones With Physical Keyboards, Feb. 7, 2012, pp. 1-9 http://www.laptopmag.com/articles/just-your-type-the-best-smartphones-with-physical-keyboards.*

*Primary Examiner* — Scott Baderman
*Assistant Examiner* — Mario M Velez-Lopez
(74) *Attorney, Agent, or Firm* — Thomas S. Grzesik; Fleit Gibbons Gutman Bongini & Bianco P.L.

(57) ABSTRACT

The present disclosure provides a method and apparatus for entering characters into an electronic device. Character inputs from a keyboard are displayed on a display of an electronic device and a set of suggested character sequences are also presented on the display in proximity to the displayed text. When a user digit position is sensed in a region of the keyboard, a suggested character sequence of the set of suggested character sequences that is associated with that region of the keyboard is visually indicated or highlighted. Responsive to a sensed motion gesture beginning at the sensed user digit position, the suggested character sequence indicated by the sensed user digit position is selected for input to the electronic device.

14 Claims, 8 Drawing Sheets

(56) References Cited

U.S. PATENT DOCUMENTS

| | | | |
|---|---|---|---|
| 8,473,843 B2* | 6/2013 | Lundy | G06F 3/0237 715/257 |
| 8,782,550 B1* | 7/2014 | Patridge | G06F 3/0488 715/702 |
| 9,030,415 B2* | 5/2015 | Salman | G06F 3/0202 345/168 |
| 9,189,472 B2* | 11/2015 | Medlock | G06F 3/04883 |
| 2006/0125659 A1* | 6/2006 | Kim | G06F 3/015 341/20 |
| 2008/0281583 A1 | 11/2008 | Slothouber et al. | |
| 2009/0007001 A1 | 1/2009 | Morin et al. | |
| 2009/0174667 A1* | 7/2009 | Kocienda | G06F 3/0237 345/169 |
| 2010/0292984 A1 | 11/2010 | Huang et al. | |
| 2011/0010655 A1 | 1/2011 | Dostie et al. | |
| 2011/0202876 A1* | 8/2011 | Badger | G06F 3/0237 715/816 |
| 2011/0285555 A1 | 11/2011 | Bocirnea | |
| 2012/0038496 A1* | 2/2012 | Edwards | G06F 3/017 341/34 |
| 2012/0075192 A1* | 3/2012 | Marsden | G06F 3/04886 345/168 |
| 2012/0092278 A1 | 4/2012 | Yamano | |
| 2012/0119997 A1 | 5/2012 | Gutowitz | |
| 2012/0223889 A1 | 9/2012 | Medlock et al. | |
| 2013/0076615 A1* | 3/2013 | Iao | G06F 3/017 345/156 |
| 2013/0268879 A1* | 10/2013 | Zhang | G06F 3/0418 715/773 |
| 2013/0285913 A1* | 10/2013 | Griffin | G06F 3/0237 345/168 |
| 2014/0002363 A1 | 1/2014 | Griffin et al. | |
| 2014/0062875 A1* | 3/2014 | Rafey | G06F 17/276 345/158 |
| 2014/0098023 A1* | 4/2014 | Zhai | G06F 3/0237 345/168 |
| 2014/0218297 A1* | 8/2014 | Mortel | G06F 3/0233 345/168 |
| 2014/0267045 A1* | 9/2014 | Grieves | G06F 17/2735 345/168 |
| 2014/0267056 A1 | 9/2014 | Pasquero et al. | |
| 2014/0282259 A1* | 9/2014 | Fujimura | G02B 27/01 715/835 |
| 2015/0029090 A1* | 1/2015 | Kim | G06F 3/04886 345/156 |

* cited by examiner

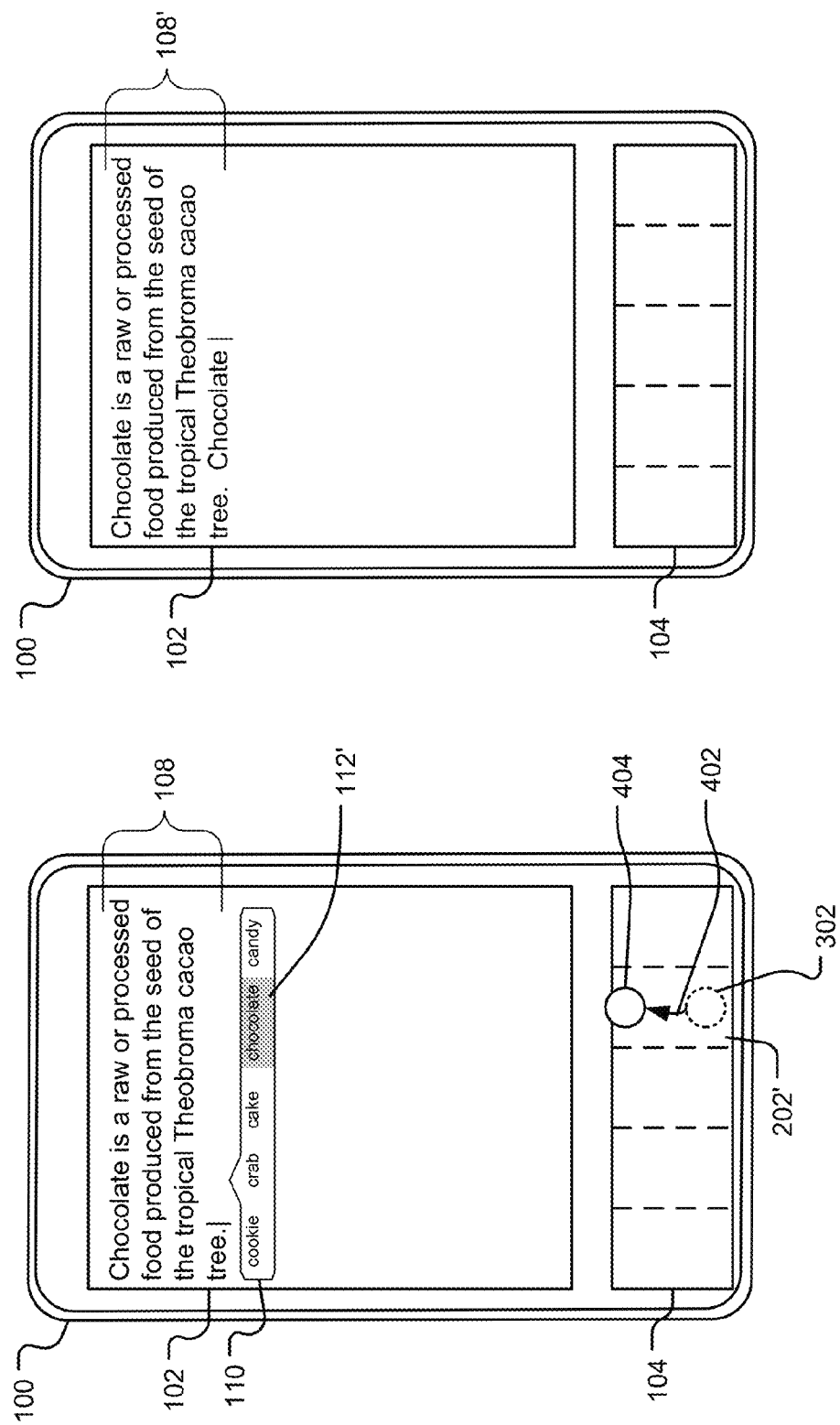

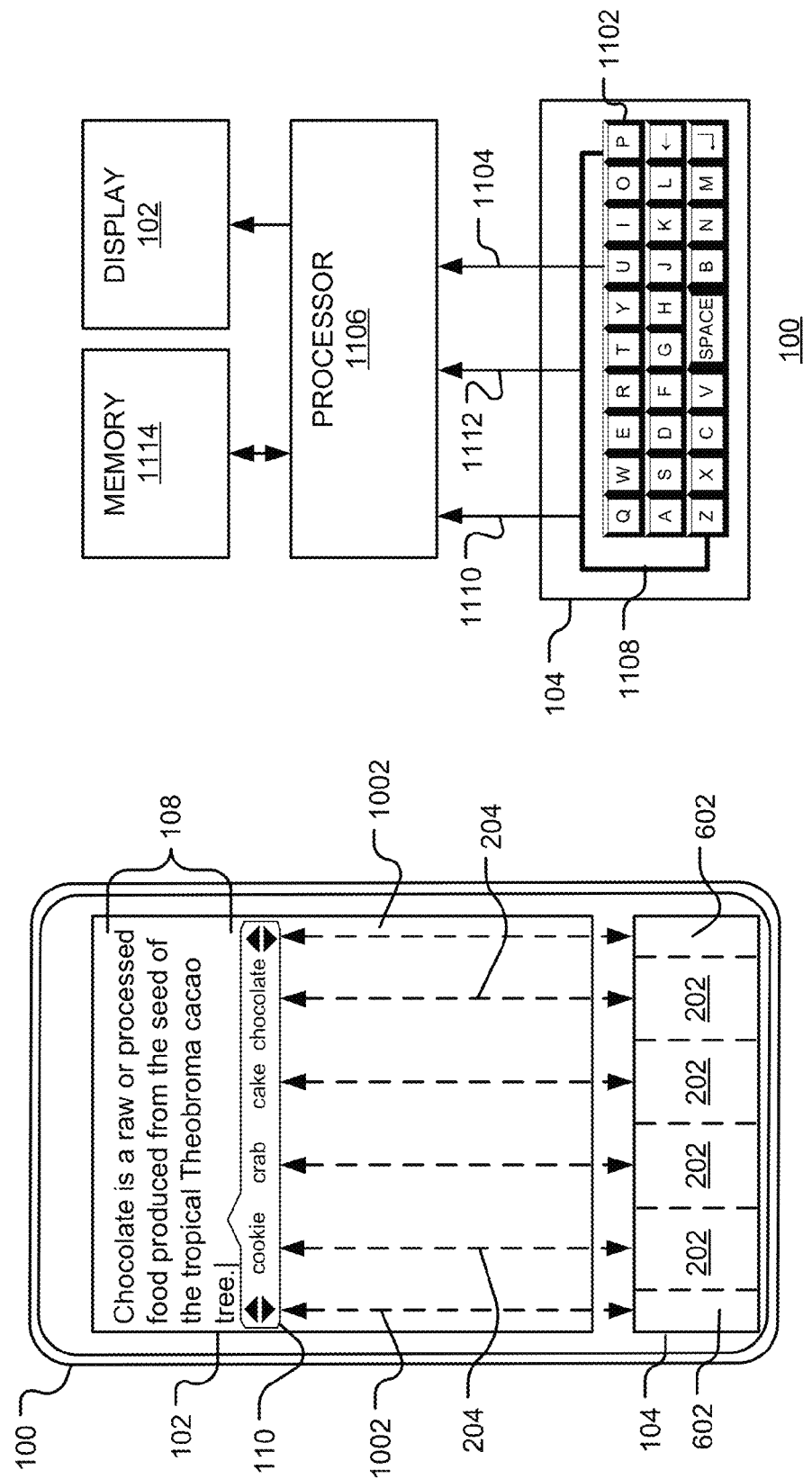

CHARACTER ENTRY FOR AN ELECTRONIC DEVICE USING A POSITION SENSING KEYBOARD

BACKGROUND

Many methods exist to enable a user to enter text into an electronic device such as, for example, a desktop computer, a laptop computer, a cellular phone, a smartphone, a personal digital assistant (PDA), a tablet computer, a navigation system, a portable media player, or another computing device. A common approach is for characters to be entered using a physical or a virtual keyboard. To aid text entry, some electronic devices use auto-complete, text prediction, or auto-correct techniques. A variety of techniques are in current usage or are known to those of ordinary skill in the art. Some techniques predict the next characters to be entered or guess likely spelling corrections for misspelled words and present the user with a number of selectable choices via a user interface. In a graphical user interface, a user may be required to select a suggested word or phrase from the presented options by 'clicking' on a displayed option with a computer mouse or 'touching' an option displayed on a touch screen. Both of these approaches require the user to move from keyboard, thus interrupting the text entry.

It would be useful to provide a way, during text entry via a keyboard, to enable user selection of suggested text without requiring a user to move from the keyboard.

BRIEF DESCRIPTION OF THE DRAWINGS

Exemplary embodiments of the present disclosure will be described below with reference to the included drawings such that like reference numerals refer to like elements and in which:

FIG. 4 and FIG. 5 are diagrammatic representations illustrating the use of a motion gesture on a keyboard to select a text suggestion, in accordance with exemplary embodiments of the present disclosure;

FIG. 10 is a diagrammatic representation of mapping between keyboard regions and presented text suggestions or scrolling functions in an electronic device, in accordance with exemplary embodiments of the present disclosure;

FIG. 11 is a block diagram of an electronic device, in accordance with exemplary embodiments of the present disclosure.

DETAILED DESCRIPTION

Figure 1:
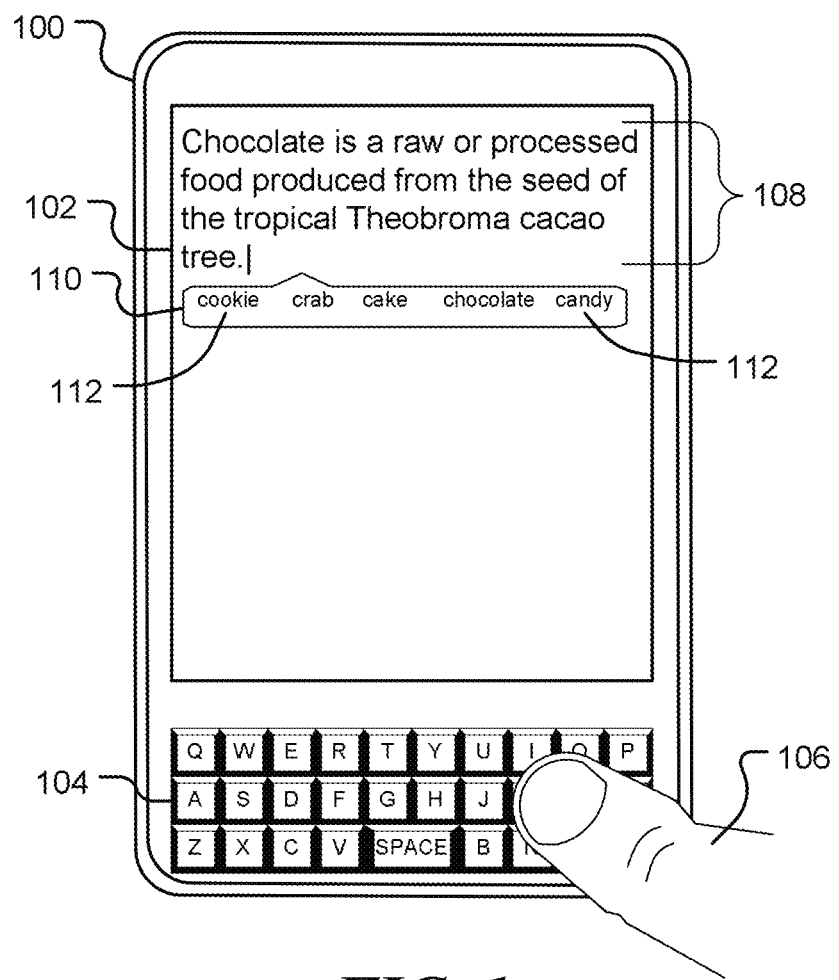
FIG. 1 is a diagrammatic representation of an electronic device, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

When entering text into an electronic device via a physical or virtual keyboard, inline text suggestions can be presented. The desired suggestion may be selected by a variety of methods, such as a swipe upwards on a region of touch sensitive surface, touching the option on a touch screen or positioning a cursor on the option and clicking to select.

In addition to a virtual keyboard, a gesture may be made on a touch sensitive area, such as capacitive physical keyboard or touch pad. In contrast to the control of the cursor, which uses sensed direction of motion, this approach uses the absolute position of a finger on the keyboard. However, only a limited number of partitions or regions (two or three) may be used on a virtual keyboard before it becomes difficult for a user to judge which region of the keyboard is associated with a desired selection. Accordingly, only a limited number of inline suggestions can be displayed at once because users don't know exactly where their fingers are located on the touch surface.

This is particularly likely to be true if the interaction is applied to a small capacitive physical keyboard. The physical keyboard is displaced from the screen and some users are more likely to look at the text being displayed on the screen rather than the keyboard itself.

In accordance with one aspect of the present disclosure, user digit position on a position sensing keyboard is sensed and used to provide a visual indication, by emphasis or highlighting, for example, of the inline suggestion that would be inserted by a swipe-up gesture from the current user digit position. In one embodiment, a small indicator at the bottom of a touchscreen display is also used. This approach enables users to be aware at all times of the suggestions that would be inserted if they performed a swipe-up gesture with their thumb or other digit (finger or thumb, for example). The addition of visual selection indicators provides feedback that facilitates more accurate selection since the effect of a swipe-up gesture is clearly indicated. This makes it possible to display a larger number of suggestions candidates in the inline box containing the suggestions.

When more than one digit is on the keyboard, more than one inline suggestion may be visually indicated and the user may perform the swipe-up gesture, or another gesture, using the digit associated with the desired selection.

One of the advantages of displaying text suggestions inline is that users may keep their eyes around the character text entry caret, rather than having to look down at a selection bar on a touchscreen or options presented on a virtual keyboard itself. While muscle memory helps a user to locate their fingers on the keyboard without having to glance at it, it is not always sufficient to avoid position errors during the swipe up gesture that is used to select the targeted suggestion.

The present disclosure may be implemented using any keyboard that is responsive to both key inputs and user digit position. An example is a capacitive physical keyboard. Alternatively, a virtual keyboard may be used. With a virtual keyboard, sensed touch may be used for character input while proximity sensing is used to estimate digit position just above the keyboard. In a still further embodiment, a virtual keyboard is presented on display that is sensitive both to touch position and to pressure.

In some embodiments, the keyboard is a capacitive physical keyboard, comprising a series of input keys comprising key covers overlaid on top of physical or electronic switches. Further, the capacitive physical keyboard contains actuators and capacitive sensors that permit both tactile input via depression of the key covers on top of the actuators and gesture input via capacitive sensors. The input resolution of keyboard may be at least to the level of a single input key; in other words, responsive to an input received via keyboard, a processor is capable of detecting which one of the plurality of input keys of keyboard was contacted. In some embodiments, an input received via keyboard can be localized to precise coordinates in the longitudinal and lateral directions on the keyboard via capacitive sensors. Alternatively, the keyboard may be a virtual keyboard displayed on touchscreen. In some embodiments, keyboard can additionally sense the position of a digit hovering proximal to one or more input keys of the keyboard, such as a thumb or finger of a user, or a stylus. Hovering digits may be sensed by capacitive sensors.

As used herein, a "key press" input received by the keyboard means a depression of one of the plurality of input keys of the keyboard to an extent that is sufficient to engage the physical or electronic switch associated with that key. Alternatively, in some embodiments the keyboard may be a virtual keyboard implemented with touchscreen, which, like a capacitive physical keyboard, is programmable to distinguish between different types of touch events like the key press and tap inputs described above. For example, the virtual keyboard may distinguish these types of events based on pressure sensed on touchscreen, or by measuring the duration of a touch event.

Visual indicators in an inline suggestions bar or pane are used to provide cues to the users as to where their fingers are located on the keyboard. The indicators inform a user that they can simply initiate the swipe up selection motion from their current finger position to inject the indicated suggestion. On the other hand, if the desired suggestion isn't highlighted or otherwise indicated, none of the user's fingers are currently resting in the correct position and the user will have to reposition one of them before initiating the swipe up selection motion or other selection motion.

In a further embodiment, the number of suggestion candidates available for selection can be increased beyond the number that can presented at any one time on the display. Sometimes, the target word the user is looking for isn't one of the top suggestion candidates. A horizontal swipe gesture, or other motion gesture, on prescribed region of the keyboard can be used to modify the displayed suggestion candidates, for example by replacing some or all of the suggestion candidates currently being displayed by a new series of suggestion candidates. In this embodiment, some regions of the keyboard are designated for selection while one or more other regions are designated for modifying the set of presented candidates.

The above description relates to selection of inline suggestion candidates. However, the disclosure is not limited to this application and may be used for other text selection applications, such as spelling correction, character or text disambiguation, word or phrase auto-completion and the like. Similarly, the methods described below have application beyond the examples provided.

FIG. 1 is a diagrammatic representation of an electronic device 100 in accordance with exemplary embodiments of the present disclosure. The electronic device 100 includes a display 102 and a keyboard 104. The display 102 or keyboard 104, or both, may be integrated with the electronic device 100 or may be separate from the electronic device and coupled to it by a wired or wireless link. In operation, the electronic device 100 receives one or more character inputs from key presses on the keyboard 104, made by user 106, and displays them as text 108 on the display 102. In response to the one or more character inputs, the electronic device determines a number of character sequences. Each character sequence 112 is a suggested text entry and comprises one or more characters. Some, or all, of the suggested character sequences 112 are displayed to the user 106 as a set of selectable character sequences 110 on the display 102. In the example shown in FIG. 1, each character sequence 112 is a predicted word, but the character sequence could be related to the text 108 in different ways. For example, the character sequences could be suggestions for correcting a misspelled word or suggestions for completing a word, phase, name, etc., or a disambiguation of a keyboard entry.

In prior approaches, to select one for the characters sequences 112 from the set of character sequences 110, a user must move a finger or cursor into the region of the display where the options 110 is presented. This requires the user to leave the keyboard 106.

In accordance with an embodiment of the present disclosure, a character sequence 112 is selectable from the keyboard 104 when the keyboard 104 is configured to be responsive to user key presses, user digit positions and user digit motion. Other keyboard constructions may be used without departing from the present disclosure.

The keyboard 104 may be used to enter characters in response to sensed key motion or sensed force applied at a specified location of a surface. A characteristic of the keyboard is that it is able to distinguish between character entry and user digit location/motion without character entry. For example, a touch sensitive surface may be placed over an array of force sensitive switches, or a touch sensitive surface may be used to detect user digit location while 'hovering' in close proximity to the surface and to enter characters in response to a touch on the surface. Alternatively, a capacitive sensing surface may be located beneath or above a physical keyboard. Other keyboard constructions may be used without departing from the present disclosure. For example, individual keys may incorporate capacitive sensing.

Figure 2:
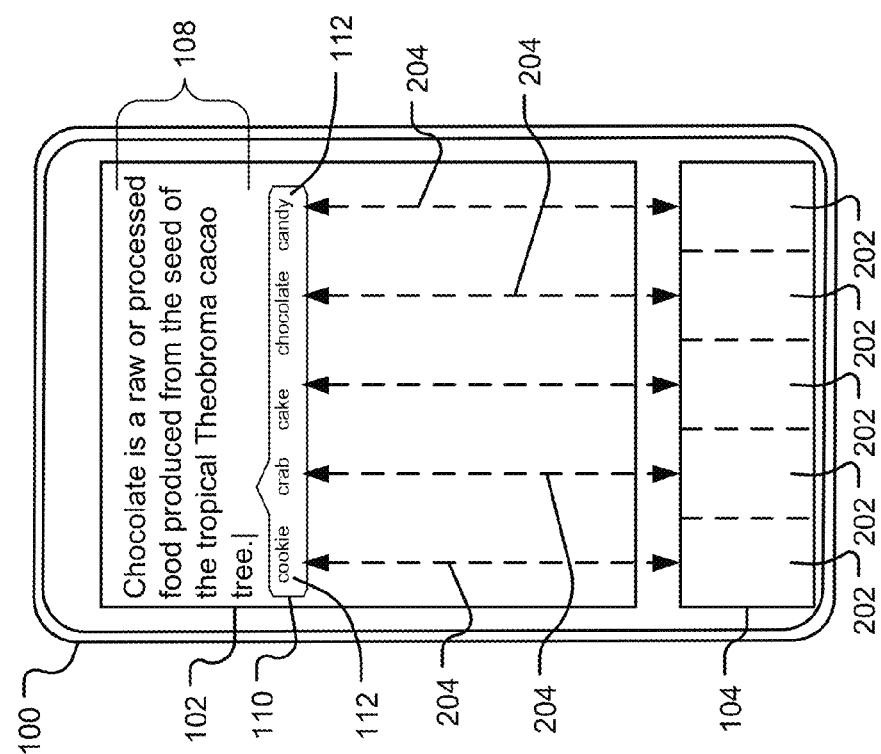
FIG. 2 is a diagrammatic representation of mapping between keyboard regions and presented text suggestions in an electronic device, in accordance with exemplary embodiments of the present disclosure.

The sensed key presses are used to enter characters, as in a conventional keyboard, the keyboard also senses user digit positions on the keyboard. Each of a number of regions is associated with a character sequence 112 of the set of character sequences 110. FIG. 2 shows an embodiment in which the keyboard 104 of the electronic device 100 is configured to have five regions, each region 202 is associated with a character sequence 112, as depicted by the arrows 204 in FIG. 2. Thus, the leftmost region is associated with the word 'cookie' in the example shown. The arrows 204 depict the association between the regions and the suggestions for purpose of explanation, and may not be shown on the display 102 during operation. In this example, the selectable suggestions 110 are shown in an inline prediction bar or pane presented close the current text entry position on the display 102.

Other embodiments may use a different number of regions 202 or a different arrangement of the regions 202 (for example, a grid arrangement rather than a row arrangement).

The suggested character sequences may be presented in display panel, and may be arranged as a horizontal list, as shown, or arranged in another pattern, such as a vertical list or array. In one embodiment, the arrangement of suggested character sequences corresponds to the arrangement of regions on the keyboard.

When a user digit position is detected within a region, the associated character sequence is indicated visually on the display, by highlighting for example. An example is shown in FIG. 3.

Figure 3:
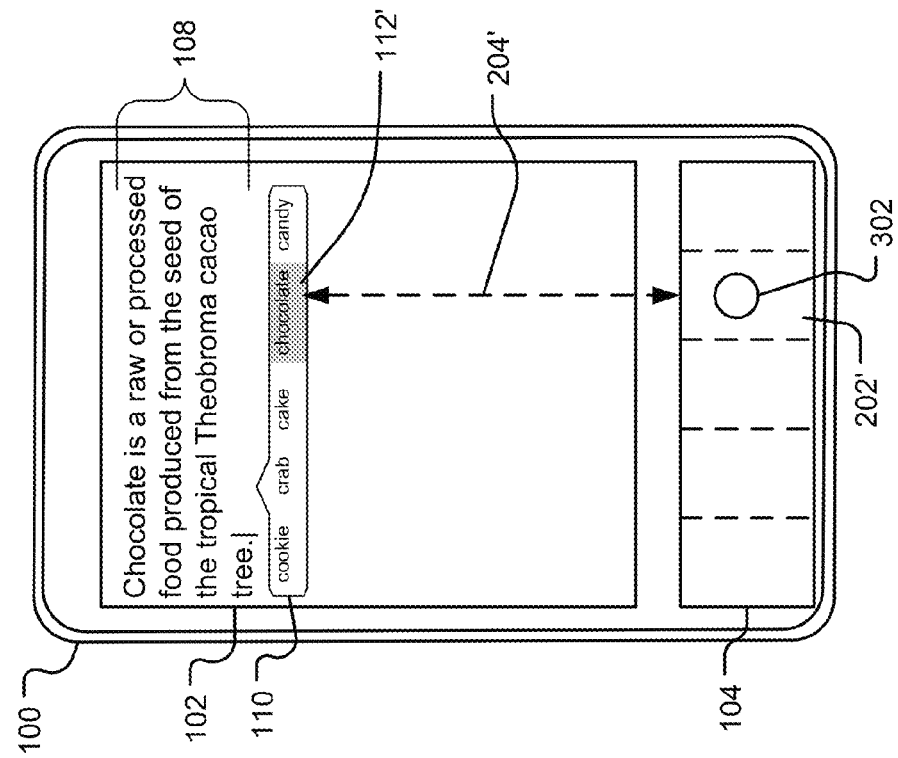
FIG. 3 is a diagrammatic representation of visual indication of text suggestion in response to user digit position in a keyboard, in accordance with exemplary embodiments of the present disclosure.

FIG. 3 is diagrammatic representation of an electronic device 100 illustrating indication of a suggested character sequence. In the example shown, a user digit position 302 is detected in the region 202'. The region 202' is associated with the character sequence 112' in the set 110. Accordingly, the character sequence 112' is indicated by an altered background color.

In accordance with one aspect of the present disclosure, visual indication of the character sequence 112' is achieved in various ways. For example, an attribute of the characters of the sequence 112', such the color, size, may be altered. Alternatively, the attributes of the character sequences other than character sequence 112' may be altered. For example, the color of non-highlighted character sequences may be changed from black to gray. In a further embodiment, an attribute of the text block of the character sequence 112' is altered. For example, the background color or the size of the text box containing the suggested character sequence may be altered. In a further embodiment, the indicated character sequence may be animated so that one or more attributes of the font or text box are varied over time. For example, the characters may alternate between two colors.

FIG. 4 is diagrammatic representation of an electronic device 100 illustrating selection of a highlighted character sequence. In the example shown, a user digit motion gesture depicted by arrow 402 is detected and interpreted as selection of the character sequence 112'. In this example, the motion gesture 402 begins at the initial sensed user digit position 302 and ends at position 404. The motion gesture may be accompanied by an animation. Once the character sequence 112' is selected, it is entered into the text 108', as shown in FIG. 5. In this way, the character sequence 'Chocolate' is entered by the user moving a digit position to the region of the keyboard associated with the word and then performing a simple motion gesture. This approach is more efficient than the user typing in the complete word using key presses.

Figure 7:
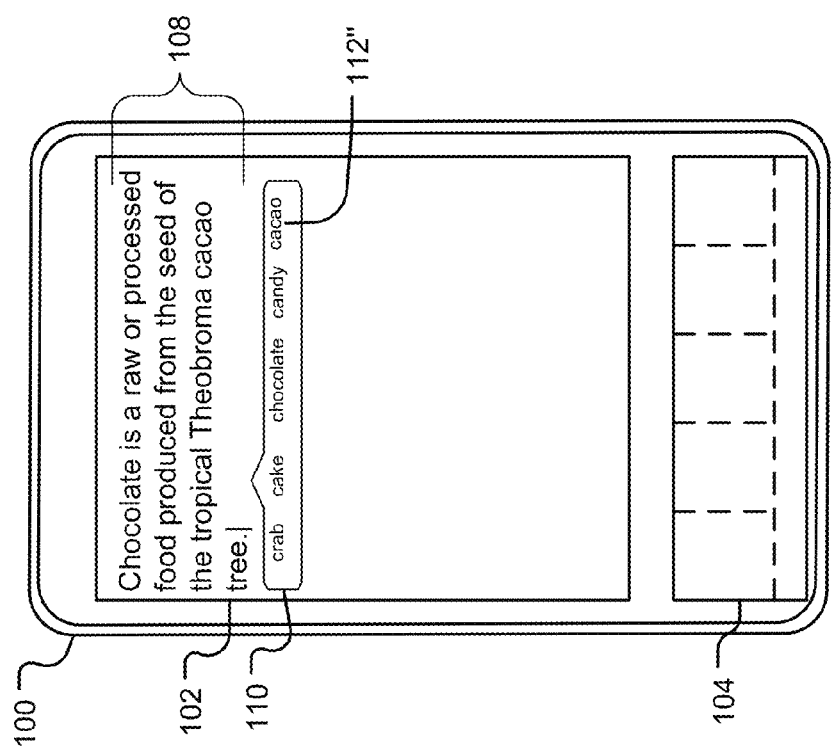
FIG. 6 and FIG. 7 are diagrammatic representations illustrating the use of a motion gesture on a region to present a modified set of text suggestions, in accordance with exemplary embodiments of the present disclosure.
Figure 6:
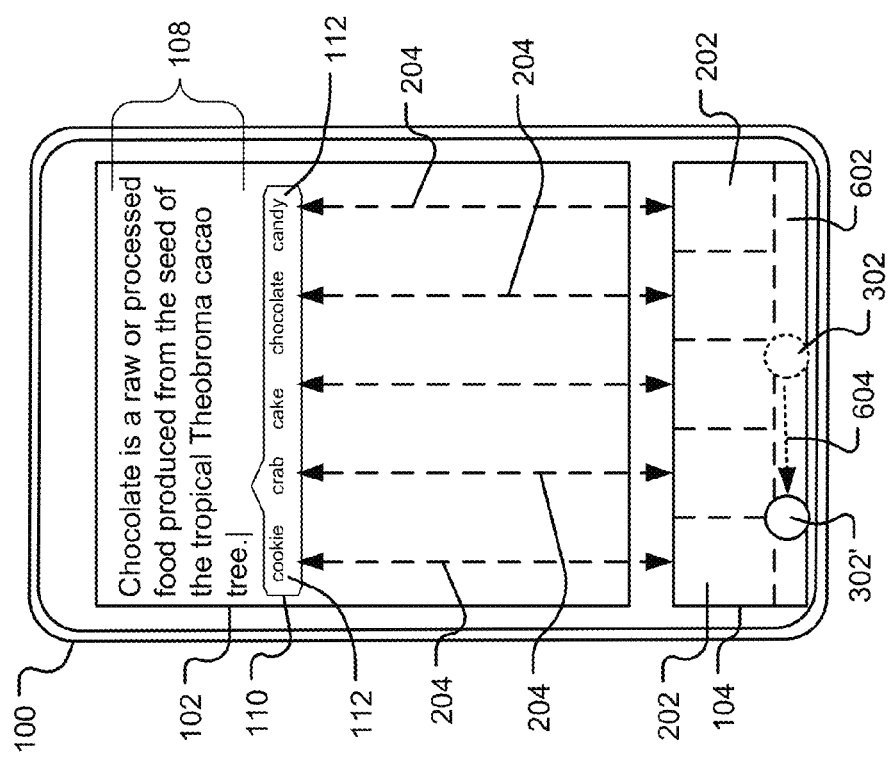

FIG. 6 is diagrammatic representation of an electronic device 100 in accordance with a further embodiment. In the embodiment shown in FIG. 6, the keyboard 104 is configured to have a row of regions 202 associated with suggested character sequences 112, as discussed above, together with an additional region 602. The additional region 602 may be used to scroll the set of suggested character sequences 110 using a lateral motion gesture starting at a user digit position 302 within the region 602. The motion gesture, denoted by arrow 604, begins at the user digit position 302 and ends at user digit position 302'. The initial user digit position 302 and the motion gesture 604 are sensed by the keyboard 104. In response, the electronic devices scrolls the set 110 to the left. The result of the motion gesture 604 is shown in FIG. 7. In the example shown in FIG. 7, the word 'cookie' is no longer displayed and a new word 'cacao' 112' is appended to the right hand end of the set 110. In this way, an increased number of suggested character sequences may be presented to the user for selection. Selection from the updated set may be made in the manner described above. In the example shown, the scroll operation replaces one word from the set of suggested words. In a further embodiment, all or some words could be replaced in response to the motion gesture 604. Thus, in general, the first set of presented suggestions is replaced a second set of suggestions.

Figure 8:
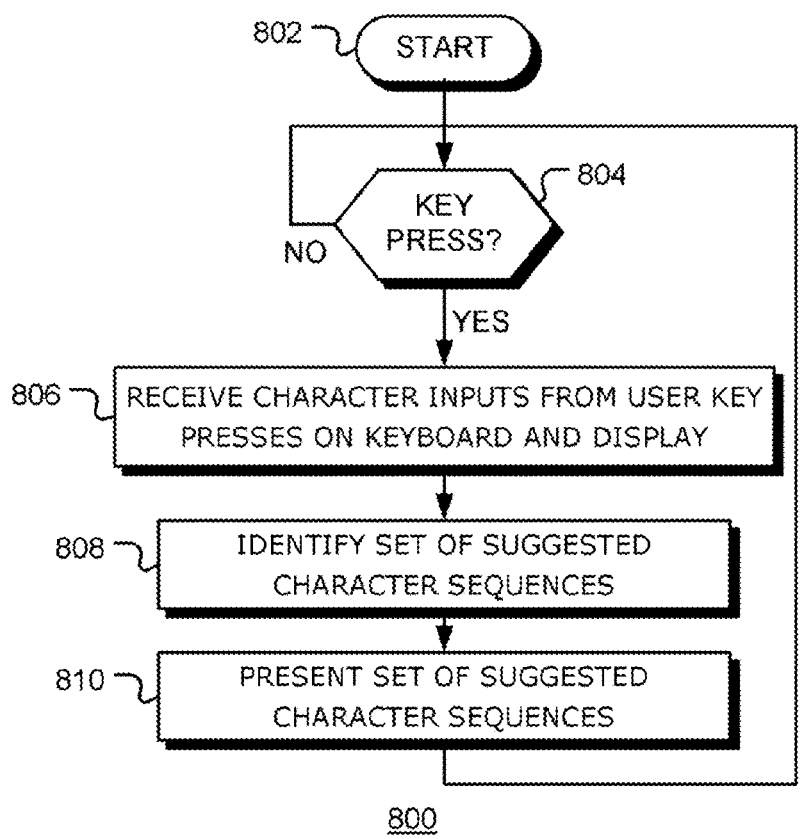
FIG. 8 is a flow chart of a method of text entry for an electronic device, in accordance with exemplary embodiments of the present disclosure.
Figure 9:
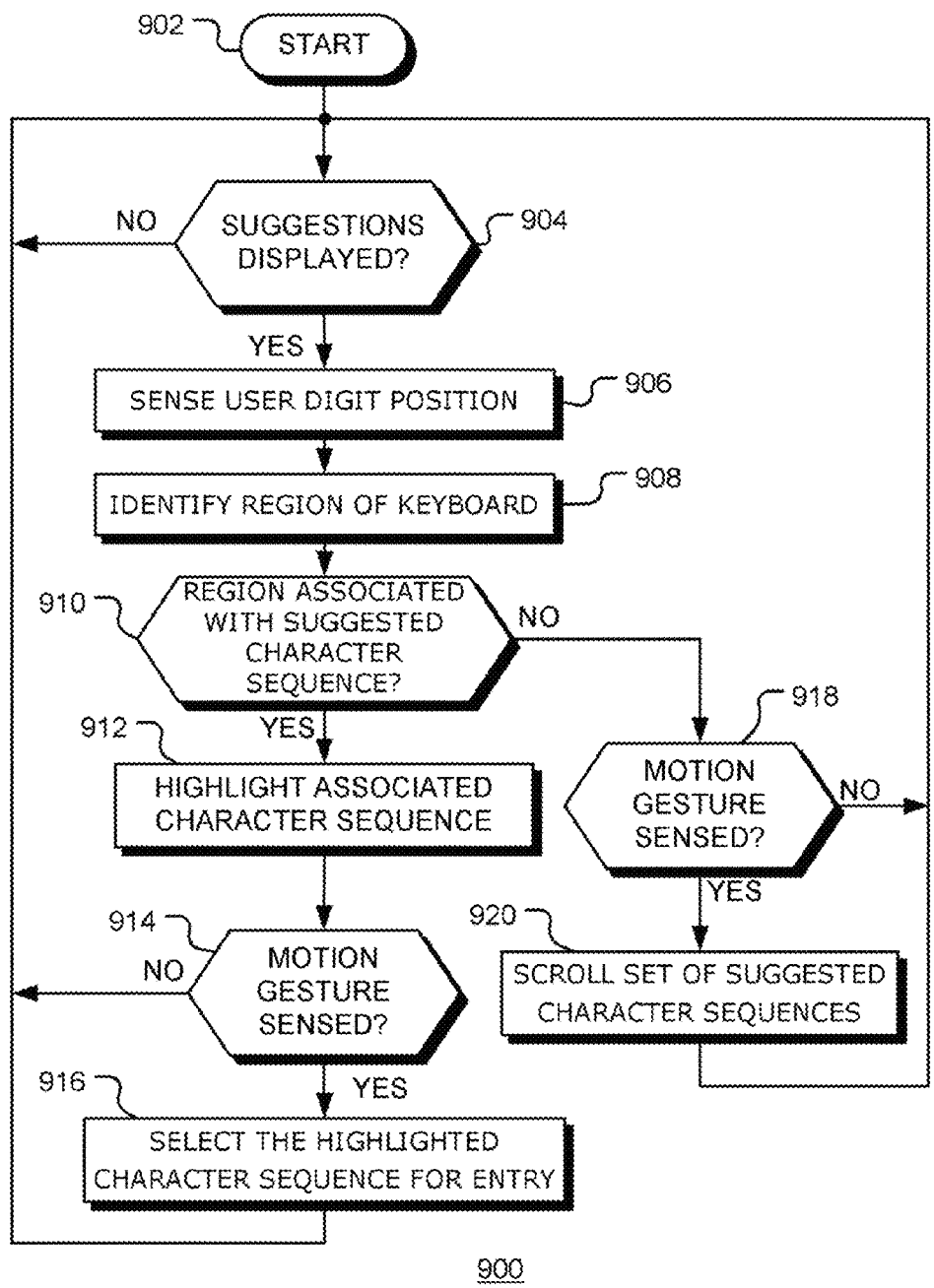
FIG. 9 is a flow chart of a method for entering a suggested text in an electronic device, in accordance with exemplary embodiments of the present disclosure.

FIG. 8 and FIG. 9 are flow charts of a method for entering characters into an electronic device in accordance with the present disclosure. Referring to the flow chart 800 shown in FIG. 8, following start 802, key presses on a keyboard operatively coupled to the electronic device are detected at decision block 804. When a key press is detected, as depicted by the positive branch from decision block 804, a corresponding character is entered into the electronic device and is presented on a display operatively coupled to the electronic device at bock 806. Responsive to the one or more character inputs, a set of character sequences are identified at block 808, each character sequence having one or more characters. In one embodiment, the character sequences are predicted from the entered text and comprise suggested text that the user may want to enter next. A number of prediction techniques are known in the art. In a further embodiment, the suggested character sequences comprise alternatives to a misspelled word in the entered text. In a still further embodiment, the suggested character sequences comprise suggested completions for partially entered words, phases, names, addresses, etc. In a still further embodiment, where the number of keys is smaller than an alphabet (for example when letters are being entered from a numeric keyboard), the suggested character sequences may comprise a set of letters associated with a pressed key.

The suggested character sequences are presented on the display at block 810 and flow returns to block 804.

The method 800 may be performed, for example, as an interrupt driven or schedule task.

In addition, the method 900 shown in FIG. 9 is performed to enable selection of a suggested character sequence. Following start 902, presentation of a set of suggested character sequences is detected at decision block 904. Is a set of suggested character sequences is currently being presented, as depicted by the positive branch from decision block 904, one or more user digit positions on the keyboard are sensed at block 906. The region of the keyboard in which the user digit position is located is identified at block 908. At decision block 910, it is determined if the identified region is associated with one of the suggested character sequences presented on the display. When the identified region of the keyboard is associated with a suggested character sequence, as depicted by the positive branch from decision block 910, the associated character sequence is highlighted at block 912. Various highlighting techniques may be used, as discussed above. At decision block 914, a motion gesture beginning at the sensed digit position is detected. The motion gesture may be an upward swipe, for example. If a motion gesture is detected, as depicted by the positive branch from decision block 914, the highlighted character sequence is selected at block for input to the electronic device. Flow then returns to decision block 904 to wait for the next set of suggested character sequences to be presented on the display.

Optionally, one or more regions of the keyboard may not be associated with a suggested character sequence. In the method depicted in flow chart 900, a region of the keyboard is associated with a scroll function. If a user digit position is not in a region of the keyboard associated with a suggested character sequence, as depicted by the negative branch from decision block 910, the position is identified as being in the region associated with the scroll function. If a motion gesture is detected in this region, the displayed set of suggested character sequences is scroll at block 920. The motion gesture may be a substantially horizontal swipe, for example, with the direction of the swipe indicating the direction of scrolling. In an alternative embodiment, the region associated with the scroll function may be on the right or left side of the keyboard and upward or downward gesture used to indicate a scroll direction. After the scrolling is complete, flow returns to decision block 904 to wait for the next set of suggested character sequences to be presented on the display.

It will be apparent to those of skill in the art that other arrangements of keyboard regions may be used. The location of, or response to, the regions may be programmable by a user. In particular, the regions may be used to make selections of components of a graphical user interface presented on the display 102. These components may be unrelated to character sequence selection as described above.

For example, the keyboard may be programmed or otherwise configured to have a row of six regions, the first and last regions may be used for scrolling while the middle four regions are used for highlighting and selection, as in the embodiment shown in FIG. 10, for example. In the embodiment shown in FIG. 10, the four regions 202 as used for highlighting and selecting displayed suggestions, while the regions 602 are associated with scrolling functions, as indicated by arrow 1002. For example, an downward gesture in a region 602 causes the next row of suggestion to be displayed while an upward gesture causes a previous row of suggestions to be displayed. The arrows 202 and 1002 are shown to depict the association with the regions for purpose of explanation, and may not actually be shown on the display 102 during normal operation. In one embodiment, each region is used separately to provide both left and right scroll by using upward and downward motion gestures.

FIG. 11 is a block diagram of an electronic device 100 in accordance with an embodiment of the disclosure. The electronic device includes a keyboard 104 having a set of physical keys 1102 that respond to user key presses to provide character inputs 1104 to a processor 1106 of the electronic device 100. The characters are presented on a display 102 of the electronic device that is operatively coupled to the processor 1106. The keyboard 102 also includes a position sensing element 1108 that is responsive to sensed user digit positions on the keyboard. The position sensing element 1108 is configured to provide, to the processor 1106, a position signal 1110 indicative of a sensed user digit position on the keyboard. The position signal 1110 causes the processor to highlight a character sequence of a set of character sequences presented on the display in response to input characters. The position sensing element 1108 also provides a motion gesture signal 1112 indicative of a sensed user gesture. The motion gesture signal 1112 causes the processor 1106 to select the highlighted character sequences on the display for input to the electronic device. Operation of the processor may be controlled by programming instructions stored in a non-transitory region of memory 1114. Further, the entered text and the selected text may be stored in the memory 1114.

In one exemplary embodiment, the processor 1106 is programmed to respond to one or more character inputs from the keys 1102 of keyboard 104 to present the one or more character inputs as text on the display 102. The processor determines a plurality of suggested character sequences, each suggested character sequence being composed of one or more characters, and presents a first set of suggested character sequences on the display 102 in proximity to the displayed text. The first set of suggested character sequences includes at least some of the plurality of suggested character sequences.

In response to a user digit positions on the position sensing element 1108 of keyboard 104, the processor 1106 identifies a region of the keyboard 104 in which the sensed user digit position is located and, when the identified region of the keyboard is associated with a suggested character sequence of the first set of suggested character sequences, the suggested character sequence that is associated with the identified region of the keyboard is visually indicated on the display 102.

In responsive to a sensed motion gesture beginning at the sensed user digit position, the processor 1106 selects the suggested character sequence indicated by the sensed user digit position for input to the electronic device 100. The selected character sequence may be stored in memory 1114.

In one embodiment, when the identified region of the keyboard 104 is a region not associated with a suggested character sequence of the displayed set of suggested character sequences, the processor selects a second set of suggested character sequences in response to a sensed motion in the identified region, and presents the second set of suggested character sequences on the display in proximity to the displayed text in place of the first set of suggested character sequences. This enables the user to select from a different or modified set of sequences.

Figure 12:
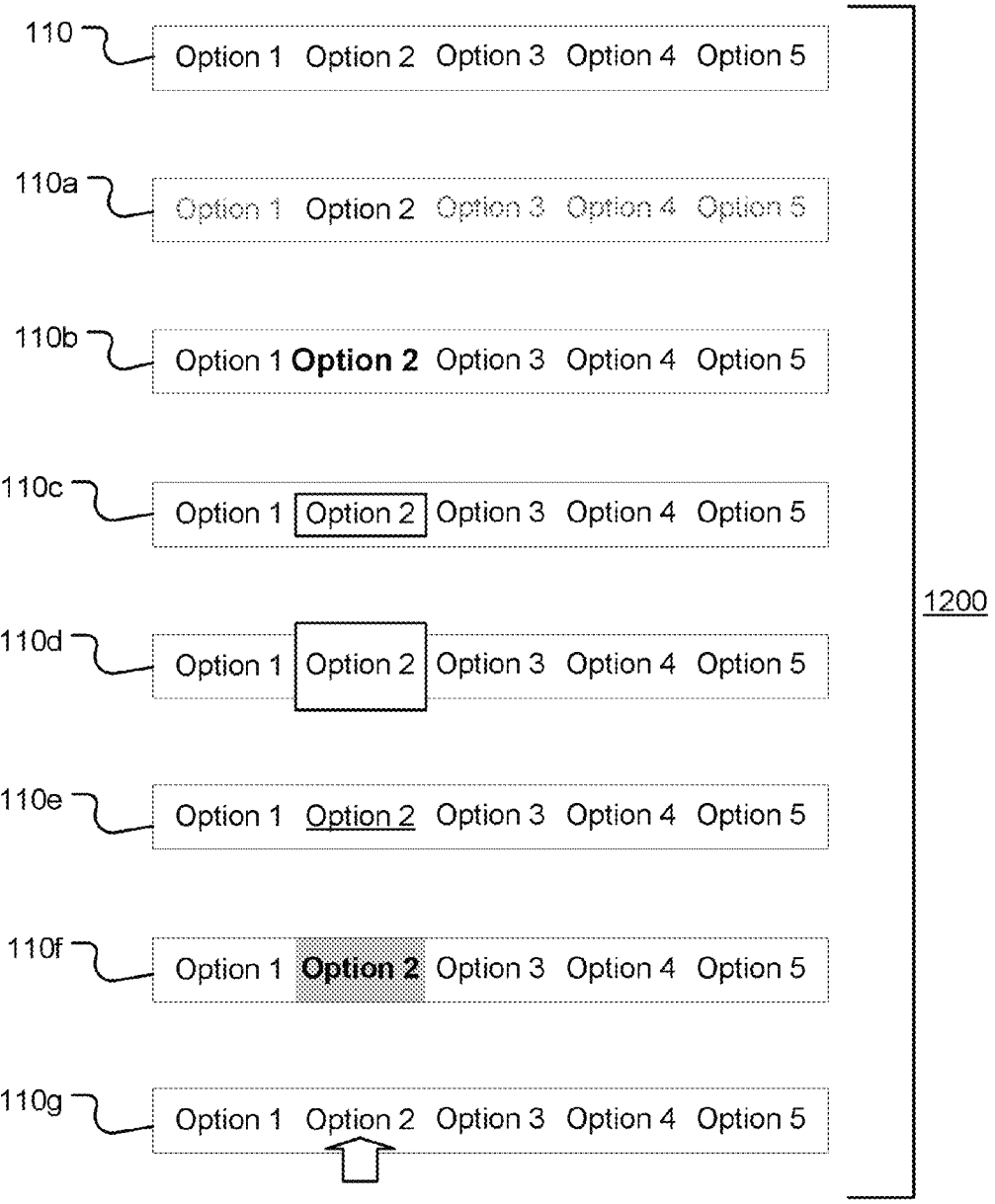
FIG. 12 illustrates methods for visually indicating text suggestions, in accordance with exemplary embodiments of the present disclosure.

FIG. 12 depicts some examples 1200 of how an suggestion or option may be visually indicated when a user digit position is detected in an associated region of the keyboard. In the example provided, five suggestion character sequences are displayed in a pane in proximity to the entered text. When no digit position is detected, as illustrated by example pane 110 in FIG. 12, the suggested character sequences ("Option 1", "Option 2", "Option 3", "Option 4", and "Option 5") are displayed with equal emphasis, that is, no highlighting. In example panes 110a-110g, "Option 2 is selected. It should be noted that one, two or more suggests may be selected, depending on how many digits are positioned on the keyboard. In pane 110a, the suggestions not selected are displayed in a different (e.g. lighter) font color. In pane 110b, the selected suggestion is indicated by a bold font. In pane 110c, the selected the selected suggestion is indicated by a box around the characters. In pane 110d, the selected the selected suggestion is indicated by enlarging the text box of the selected suggestion. In pane 110e, the selected the selected suggestion is indicated by underlining the characters. In pane 110f, the selected the selected suggestion is indicated by altering the background color of the selected text block. In pane 110c, the selected the selected suggestion is indicated by displaying a graphical indicator in proximity to the selected suggestion. In this example an arrow is used in close proximity to the selection, but other graphical indicators could be used.

Other methods for visually indicating may be used, for example: varying the color, style, size, weight, position or other attribute of the characters, and/or varying the color, style, size, weight, position or other attribute of the text box containing the characters, and/or animating one or more attributes of the characters. These methods may be used alone or in combination and may be user selectable.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for entering characters into an electronic device, comprising:
   responsive to one or more character inputs from a keyboard operatively coupled to the electronic device:
      displaying the one or more character inputs as text on a display operatively coupled to the electronic device;
      determining a plurality of suggested character sequences, each suggested character sequence comprising one or more characters; and
      presenting a first set of suggested character sequences on the display in proximity to the displayed text and above the keyboard, the first set of suggested character sequences comprising at least some of the plurality of suggested character sequences, wherein each suggested character sequence in the first set of suggested character sequences is presented above a different region of the keyboard configured to receive a motion gesture for selecting the suggested character sequence;
   responsive to one or more sensed user digit positions on the keyboard:
      for each sensed user digit position:
         identifying a region of the keyboard in which the sensed user digit position is located; and
         when the identified region of the keyboard is associated with a suggested character sequence of the first set of suggested character sequences, visually indicating the suggested character sequence of the first set of suggested character sequences that is associated with the identified region of the keyboard; and
   responsive to a sensed motion gesture beginning at a sensed user digit position of the one or more sensed user digit positions position:
      selecting the suggested character sequence indicated by the sensed user digit position for input to the electronic device.

2. The method of claim 1, further comprising:
   when the identified region of the keyboard is a region not associated with a suggested character sequence of the first set of suggested character sequences:
      selecting a second set of suggested character sequences from the plurality of suggested character sequences in response to a sensed motion in the identified region; and
      presenting the second set of suggested character sequences on the display in proximity to the displayed text in place of the first set of suggested character sequences.

3. The method of claim 1, wherein the keyboard and display are coupled to the electronic device, the keyboard being located below the display, and wherein each suggested character sequence of the first set of suggested character sequences is presented on the display directly above the region of the keyboard with which it is associated.

4. The method of claim 1, wherein the suggested character sequences comprise predicted words.

5. The method of claim 1, wherein visually indicating the suggested character sequence of the first set of suggested character sequences that is associated with the identified region of the keyboard comprises one or more of:
   changing an attribute of the characters of the suggested character sequence;
   changing an attribute of the text block of the suggested character sequence;
   changing an attribute of the characters of the suggested character sequences other than the sequence associated with the identified region of the keyboard;
   changing an attribute of the text block of the suggested character sequences other than the sequence associated with the identified region of the keyboard;
   animating the suggested character sequence; and
   displaying a graphical indicator in close proximity to or around the suggested character sequence.

6. An electronic device comprising:
   a display;
   a keyboard responsive to user key presses, user digit positions and user digit motion; and
   a processor operatively coupled to the display and the keyboard, the processor configured to perform a method comprising:
      responsive to one or more character inputs from a keyboard operatively coupled to the electronic device:

displaying the one or more character inputs as text on a display operatively coupled to the electronic device;

determining a plurality of suggested character sequences, each suggested character sequence comprising one or more characters; and presenting a first set of suggested character sequences on the display in proximity to the displayed text and above the keyboard, the first set of suggested character sequences comprising at least some of the plurality of suggested character sequences, wherein each suggested character sequence in the first set of suggested character sequences is presented above a different region of the keyboard configured to receive a motion gesture for selecting the suggested character sequence;

responsive to one or more sensed user digit positions on the keyboard:

for each detected user digit position:

identifying a region of the keyboard in which the sensed user digit position is located; and when the identified region of the keyboard is associated with a suggested character sequence of the first set of suggested character sequences, visually indicating the suggested character sequence of the first set of suggested character sequences that is associated with the identified region of the keyboard; and responsive to a sensed motion gesture beginning at a sensed user digit position of the one or more sensed user digit positions position:

selecting the suggested character sequence indicated by the sensed user digit position for input to the electronic device.

7. The electronic device of claim 6, wherein the keyboard comprises a plurality of keys arranged on a 10×3 grid, the keyboard configure to have a plurality of regions each region occupying a 2×3 region of the grid.

8. The electronic device of claim 6, wherein the keyboard comprises a plurality of keys arranged on a 10×3 grid, and the keyboard is configured as five 2×2 regions of the grid each associated with a suggested character sequence and a 10×1 region of the grid configured to modify the set of suggested character sequences.

9. The electronic device of claim 6, wherein the keyboard comprises a physical keyboard with capacitive position sensing and a plurality of input keys.

10. The electronic device of claim 6, wherein the keyboard comprises a virtual keyboard with proximity position sensing.

11. An electronic device keyboard, the keyboard comprising:

a plurality of physical keys responsive to user key presses and operable to provide character inputs to a processor of an electronic device for presentation on a display of the electronic device, the display operatively coupled to the processor;

a position sensing element responsive to sensed user digit positions and configured to provide to the processor of the electronic device:

a position signal indicative of a sensed user digit position that causes the processor to identify a region in a plurality of regions of the keyboard at which the user digit position was sensed, identify a character sequence from a plurality of character sequences each presented on the display above a different region of the keyboard configured to receive a motion gesture for selecting the suggested character sequence, and highlight the character sequence of the plurality of character sequences presented on the display in response to input characters; and a motion gesture signal indicative of a sensed user gesture that causes the processor to select the highlighted character sequences for input to the electronic device.

12. A non-transitory computer-readable medium having computer-executable instructions that, when executed by a processor, cause the processor to perform a method comprising:

responsive to one or more character inputs from a keyboard operatively coupled to the electronic device:

displaying the one or more character inputs as text on a display operatively coupled to the electronic device;

determining a plurality of suggested character sequences, each suggested character sequence comprising one or more characters; and presenting a first set of suggested character sequences on the display in proximity to the displayed text and above the keyboard, the first set of suggested character sequences comprising at least some of the plurality of suggested character sequences, wherein each suggested character sequence in the first set of suggested character sequences is presented above a different region of the keyboard configured to receive a motion gesture for selecting the suggested character sequence;

responsive to one or more sensed user digit positions on the keyboard:

for each detected user digit position:

identifying a region of the keyboard in which the sensed user digit position is located; and when the identified region of the keyboard is associated with a suggested character sequence of the first set of suggested character sequences, visually indicating the suggested character sequence of the first set of suggested character sequences that is associated with the identified region of the keyboard; and responsive to a sensed motion gesture beginning at a sensed user digit position of the one or more sensed user digit positions position:

selecting the suggested character sequence indicated by the sensed user digit position for input to the electronic device.

13. The non-transitory computer-readable medium of claim 12, wherein the method performed by the processor further comprises:

when the identified region of the keyboard is a region not associated with a suggested character sequence of the first set of suggested character sequences:

selecting a second set of suggested character sequences from the plurality of suggested character sequences in response to a sensed motion in the identified region; and presenting the second set of suggested character sequences on the display in proximity to the displayed text in place of the first set of suggested character sequences.

14. The non-transitory computer-readable medium of claim 12, wherein visually indicating the suggested character sequence of the first set of suggested character sequences that is associated with the identified region of the keyboard comprises one or more of:
- changing an attribute of the characters of the suggested character sequence;
- changing an attribute of the text block of the suggested character sequence;
- changing an attribute of the characters of the suggested character sequences other than the sequence associated with the identified region of the keyboard;
- changing an attribute of the text block of the suggested character sequences other than the sequence associated with the identified region of the keyboard;
- animating the suggested character sequence; and
- displaying a graphical indicator in close proximity to or around the suggested character Sequence.

\* \* \* \* \*